United States Patent [19]

Redeker

[11] Patent Number: 4,597,070
[45] Date of Patent: Jun. 24, 1986

[54] GEOPHONE

[75] Inventor: Maynard S. Redeker, Dallas, Tex.

[73] Assignee: Mobil Oil Corporation, New York, N.J.

[21] Appl. No.: 568,302

[22] Filed: Jan. 4, 1984

[51] Int. Cl.⁴ ............................................. H04R 11/00
[52] U.S. Cl. .................................... 367/185; 367/182; 310/15
[58] Field of Search ............... 367/178, 182, 183, 184, 367/185, 186, 187, 153, 155; 73/652; 324/207; 29/602 R, 602 A; 310/15, 24, 25, 26, 27, 36

[56] References Cited

U.S. PATENT DOCUMENTS

| | | | |
|---|---|---|---|
| 3,100,292 | 8/1963 | Warner, Jr. et al. | 367/185 |
| 3,582,874 | 3/1969 | Fedoseenko et al. | 367/185 |
| 3,835,427 | 9/1974 | Breitbach | 367/185 |
| 4,517,514 | 5/1985 | Howell | 367/185 |

Primary Examiner—Nelson Moskowitz
Assistant Examiner—Ian J. Lobo
Attorney, Agent, or Firm—Alexander J. McKillop; Michael G. Gilman; Charles J. Speciale

[57] ABSTRACT

An improved geophone for seismic prospecting is disclosed which features plural magnets of varying mass oscillating with varying frequencies within one or plural coils whereby the frequency response of the geophone may be optimized.

7 Claims, 4 Drawing Figures

GEOPHONE

FIELD OF THE INVENTION

This invention relates to data gathering instruments; more specifically, the invention relates to improvements in the geophones used to detect return of seismic signals transmitted into the earth, for example, during seismic exploration for oil, gas and other minerals.

BACKGROUND OF THE INVENTION

It is now common practice to perform seismic exploration of the earth by imparting an acoustic wave to the earth at a first location and detecting the return of the wave after reflection from subterranean rock formations at plural additional locations. The signals output by the detectors, usually referred to as "geophones" when used in earth-based exploration and as "hydrophones" in ocean-going operations, can then be processed in known fashion to generate representations of the interfaces between rock layers of varying density which then can be used by geophysicists in the search for oil and gas.

To date, all geophones of which the present inventor is aware are generally similar in that they contain a single magnetized mass oscillating in a coil in which there is generated a voltage in response to the oscillation. The detector is coupled to the earth, so that it oscillates in response to the returned wave of seismic energy. The magnetic mass is typically spring loaded and its oscillatory motion is damped by a dashpot or similar device. Any such system has a frequency response which is nonlinear, and therefore the voltage generated in the coil, which is recorded as the seismic signal, will bear a similarly nonlinear relationship to the actual received seismic signal as well. It is believed that it would be desirable to provide a geophone having a more balanced frequency response, as this might enable subsequent data processing to yield a more realistic depiction of the earth's structure. It would also be desirable to provide a geophone in which the different frequency components of the output signal could be separately generated at the geophone, rather than in subsequent processing steps, for increased accuracy in discrimination between various types of seismic events exhibiting frequency dependency.

OBJECTS OF THE INVENTION

Accordingly, it is an object of the invention to provide a geophone which has improved spectral balancing.

It is a further object of the invention to provide a geophone in which different frequency components of the output signal are provided separately.

A further object of the invention is to provide an improved geophone comprising multiple moving magnetic masses which have different constants in their motion equations, whereby their frequency responses are different and are chosen such that their individual frequency responses can be summed to result in a substantially linear frequency response curve.

SUMMARY OF THE INVENTION

The above mentioned needs of the art and objects of the invention are satisfied by the present invention which comprises a geophone having multiple moving magnetic elements of varying mass arranged within it. In one embodiment, all the moving masses are surrounded by a single coil, so that the signal output by this coil is effectively proportional to the sum of the responses of all the magnetic masses. In another embodiment, each of the moving masses is surrounded by its own coil, so the signals output by the varying coils can be processed separately for further analysis of frequency dependent information is desired.

BRIEF DESCRIPTION OF THE DRAWINGS

Reference to the drawings is made for improved understanding of the invention, in which.

DESCRIPTION OF THE PREFERRED EMBODIMENTS

Figure 1:
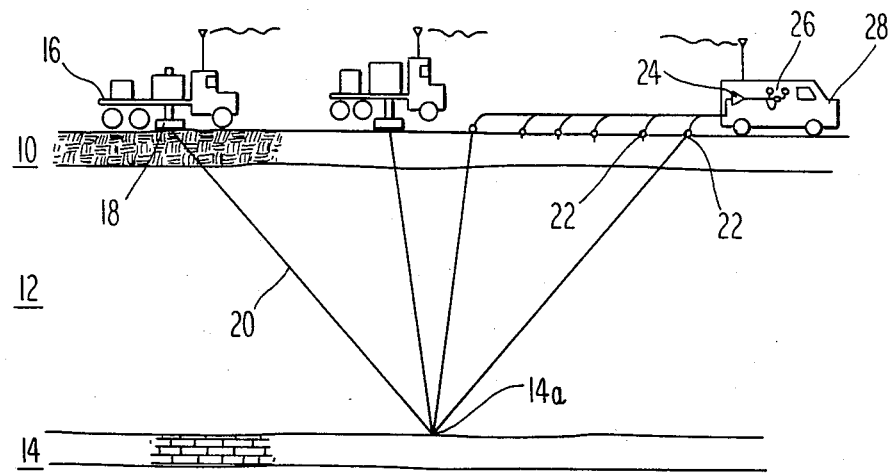
FIG. 1 shows a conventional exploration layout.

FIG. 1 shows a conventional seismic exploration operation. A source of acoustic energy is shown at 16. Commonly, this is a truck having a baseplate 18 mounted on a jack, so that the entire truck may be lifted off the ground, resting upon the baseplate 18. Vibration is then imparted to the entire truck, and the acoustic wave thus generated passes into the surface of the earth passing through varying rock layers 10 and 12, along ray paths indicated generally at 20. The wave may be reflected from a subsurface layer 14 and be reflected back upwardly to be detected by a geophone 22. Typically, this will simply comprise a body having a spur portion for firm insertion into the surface of the earth. Within the body portion is mounted a magnetic mass within a coil for oscillation, so that when the geophone oscillates in response to the return of the acoustic wave, the magnetic mass oscillates with respect to the coil, so that the coil outputs an electrical signal. This signal can then be amplified at 24 and recorded at 26 by mobile equipment carried within a second truck 28. These signals are then processed in a way not relevant here to yield information concerning the structure of the earth.

As mentioned above, prior art geophones typically comprise but a single moving magnetic mass, spring-mounted for oscillation. Such a spring/mass system will invariably have a characteristic and nonlinear frequency response curve. This is undesirable inasmuch as the seismic signals output by the trucks typically vary over some frequency range, typically on the order of between 10 and 200 hz. It is desirable to provide a detector which responds to all frequencies of interest substantially equally. Another improvement would be to provide a detector which outputs separate signals each responsive only to subportions of the seismic band. The latter might be of use where portions of the earth structure of interest responded differently to acoustic waves of different frequency, that is, had themselves a nonlinear frequency response.

Figure 2:
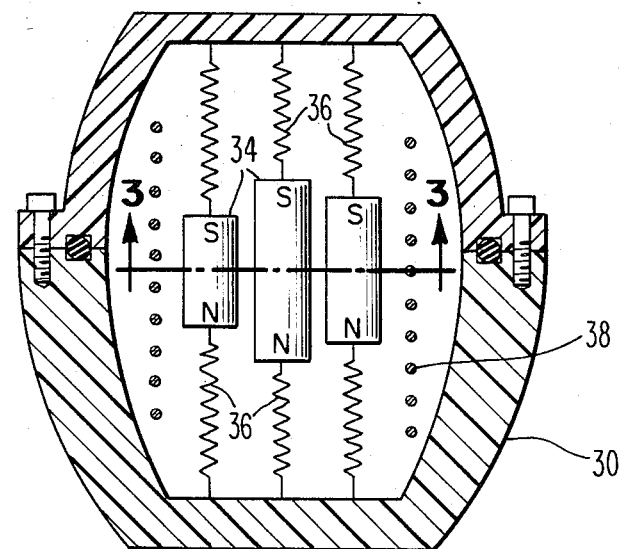
FIG. 2 shows a partly cross sectional side view of the improved geophone of the invention.

FIG. 2 shows how a geophone having these characteristics may be constructed. Again, a simple body portion 30 is provided with a spur portion 32 for insertion into the earth. However, within the body portion 30 are suspended a plurality of magnetic masses 34 each of different mass. Each of the magnetic masses 34 might additionally be supported on springs 36 of different spring constant, and the damping means applied to them (not shown) might also vary. Accordingly, the frequency response of the various magnetic masses and their suspension springs 36 will vary, and can be adjusted so that the frequency response of the magnetic system as a whole is substantially flat, or has any other desired shape. In the embodiment shown, a single coil 38 surrounds all the magnetic masses, and accordingly outputs a signal effectively proportional to the movement of all the magnetic masses 34. That is, if the masses 34 and the corresponding spring 36 were optimized to provide a flat total oscillatory frequency response, a similarly flat electrical signal will be automatically output by the coil 38, presuming other factors, such as the specific magnetivity of the masses 34 and the electrical "coupling" of the magnets to the coil 38 were constant.

Figure 3:
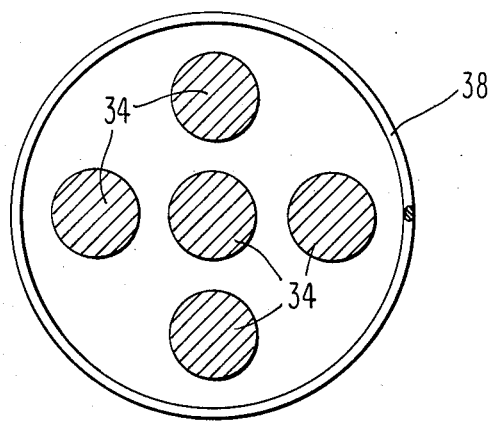
FIG. 3 shows a cross section taken on the line 3—3 of FIG. 2.

FIG. 3 shows a cross sectional view along the line 3—3 of FIG. 2, illustrating how a plurality of magnetic masses 34 might be arranged compactly to fit within the body member and how the single coil 38 can be arranged to surround all the magnetic masses 34.

Figure 4:
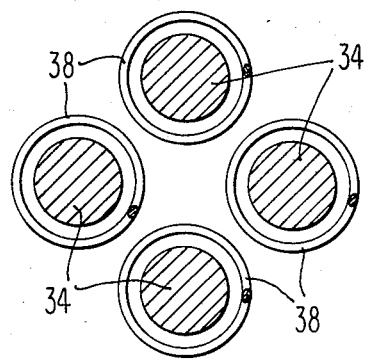
FIG. 4 shows an alternative embodiment of the geophone according to the invention in a view corresponding to FIG. 3.

FIG. 4 shows another embodiment of the invention in which each magnetic mass 34 is surrounded by its own coil 38. This would enable the output signals from each coil 38 to be recorded separately from one another, which would be useful in subsequent data processing steps designed to separate out structure according to frequency response, whereby substantial additional information might be obtained.

While a preferred embodiment of the invention has been shown and described, the invention should not be limited thereby, but only by the following claims.

I claim:

1. An instrument for outputting electrical signals in response to oscillation by seismic energy comprising magnetic means, means supporting said magnetic means for oscillation, and coil means for surrounding said magnetic means and for outputting an electrical signal proportional to the oscillation of said magnetic means, wherein said magnetic means comprises plural magnetic masses of varying mass, the mass of each of said plural masses being chosen to optimize the frequency response of said instrument as a whole.

2. The instrument of claim 1 wherein said magnetic masses are supported on springs and the spring constants of said springs are chosen in accordance with the masses of the corresponding magnetic masses so as to optimize the frequency response of said instrument.

3. The instrument of claim 2 wherein said magnetic masses are a plurality of magnets arranged within a single coil.

4. The instrument of claim 2 wherein plural coils are provided, surrounding individual ones of said masses.

5. An improved geophone of the class in which a magnet is supported for oscillation within a coil, wherein the improvement comprises providing plural magnets of varying mass such that various frequency components of an input seismic wave excite oscillation of said plural magnets differingly, and wherein coil means are provided for generating an output signal in response to said oscillations.

6. The geophone of claim 5 wherein a single coil surrounds all of said plural magnets for generating said output signal.

7. The geophone of claim 5 wherein a plurality of coils are provided, surrounding said each of said magnets individually, whereby the signals output by said coils correspond to frequency-dependent portions of said oscillations.

* * * * *